United States Patent [19]

Wobbe et al.

[11] Patent Number: 5,318,358
[45] Date of Patent: Jun. 7, 1994

[54] SCREW KNEADER FOR PLASTIC MATERIAL HAVING A CONTROLLING MIXING SECTION

[75] Inventors: Hans Wobbe, Malmsheim; Eberhard Uhland, Bietigheim-Bissingen, both of Fed. Rep. of Germany

[73] Assignee: Werner & Pfleiderer GmbH, Stuttgart, Fed. Rep. of Germany

[21] Appl. No.: 961,452

[22] Filed: Oct. 15, 1992

[30] Foreign Application Priority Data

Oct. 15, 1991 [DE] Fed. Rep. of Germany ....... 4134026

[51] Int. Cl.$^5$ .............................. B01F 7/08; B29B 7/48
[52] U.S. Cl. .................................... 366/85; 366/88; 366/90; 366/319; 366/321; 366/322; 425/208
[58] Field of Search ................... 366/69, 79, 81, 83, 366/84, 85, 88, 90, 297, 300, 301, 319, 321, 324, 322; 425/204, 208, 209; 100/145; 198/662, 664, 665, 669, 676

[56] References Cited

U.S. PATENT DOCUMENTS

| Re. 23,948 | 2/1955 | Fuller | 425/204 X |
|---|---|---|---|
| 3,252,182 | 5/1966 | Colombo | |
| 3,382,536 | 5/1968 | Fritsch et al. | 366/88 X |
| 3,652,064 | 3/1972 | Lehnen et al. | 366/90 X |
| 3,680,844 | 8/1972 | Menges et al. | 366/79 |
| 3,690,623 | 9/1972 | Boyne | 366/90 X |
| 3,843,757 | 10/1974 | Ehrenfreund et al. | 425/208 X |
| 3,941,535 | 3/1976 | Street | 366/90 X |
| 4,416,606 | 11/1983 | Sugano et al. | 366/321 X |
| 4,600,311 | 7/1986 | Mourrier et al. | 366/88 |
| 5,044,759 | 9/1991 | Gagliani | 366/90 X |

FOREIGN PATENT DOCUMENTS

| 1554761 | 1/1970 | Fed. Rep. of Germany . | |
|---|---|---|---|
| 1657574 | 2/1971 | Fed. Rep. of Germany . | |
| 2117997 | 10/1971 | Fed. Rep. of Germany | 425/208 |
| 1442473 | 5/1965 | France . | |
| 2563462 | 4/1984 | France . | |
| 228921 | 7/1969 | U.S.S.R. | 366/83 |
| 1200919 | 8/1970 | United Kingdom . | |

Primary Examiner—Harvey C. Hornsby
Assistant Examiner—Charles Cooley
Attorney, Agent, or Firm—Ladas & Parry

[57] ABSTRACT

A screw kneader for a plastic material in which a pair of longitudinal screws are rotatably mounted in respective bores for conveying plastic material through the kneader. The screws have spaced portions for advancing the plastic material from an inlet region to an outlet region and between the spaced portions is a section with reversed threads opposing plastic flow to effect mixing of the plastic material. The threads of the intermediate section are provided with openings to permit passage of up to 20% of said plastic material in the direction of advance. Transfer elements with helical threads connect opposite ends of the threads in the intermediate section with the threads of the inlet and outlet regions. The transfer elements of the two screws mutually engage one another to strip plastic material from one another and from the walls of the bores.

12 Claims, 4 Drawing Sheets

SCREW KNEADER FOR PLASTIC MATERIAL HAVING A CONTROLLING MIXING SECTION

FIELD OF THE INVENTION

The invention relates to a screw kneader for plastic material of the type having two parallel meshing screws coaxially mounted for rotation in adjacent overlapping bores provided in a housing.. The screws have threads for advancing the plastic material through the housing from an inlet section to an outlet section. In the inlet and outlet sections, the threads of the two screws mesh with one another to convey the plastic material while stripping the plastic material from the screw threads and from the walls of the bores. Between the inlet and outlet sections of the kneader, a mixing section is provided in which the plastic material is conveyed backwards by threads of opposite hand from the threads of the screws in the inlet and outlet sections, the threads in the mixing section having openings for passage of a portion of the plastic material therethrough in the direction of advance.

BACKGROUND AND PRIOR ART

A screw kneader of this type is disclosed in DE-OS 15 54 761, wherein a cylindrical or spherical transfer segment is arranged between the threads in the mixing section and the threads in the inlet and outlet sections. The transfer segment has the disadvantage of producing build-up or accumulation of plastic material in the mixing section. The transfer of plastic material to and from the mixing section becomes discontinuous and consequently the residence time of the mixed material is non-uniform. The self-cleaning effect of the threads in the mixing section and the inlet and outlet sections is negated in the transfer segments and deposits of plastic material are formed which lead to a reduction in the quality of the mixed material. Mixing of additives with the basic plastic material is not provided.

Another multipurpose mixing and kneading apparatus, also operating continuously, is disclosed in DE OS 16 57 574 wherein the transfer segments have formed transfer surfaces arranged in a staggered manner with respect to the threads of the kneader so that a self-cleaning effect is also obtained in the transfer regions. This self-cleaning effect, however, has no effect on the walls of the bores in the housing, so that at least in this region so-called dead zones are formed. The transfer surfaces cooperate symmetrically in pairs and serve exclusively for the formation of kneading surfaces and thus for dispersive treatment of the mixed material by the introduction of shearing energy. Since flows of mixed material are not formed, any dispersion and distribution of the mixed material does not occur within the kneading apparatus. Hence, this apparatus is not suitable for the intermixing and homogeneous distribution of additive components.

SUMMARY OF THE INVENTION

An object of the invention is to provide a screw kneader with positive distributive mixing of components in a total mixture of plastic materials.

This and other objects are achieved according to the invention in that the threads of the screws in the mixing section are provided with openings for conveying plastic material in the direction of advance such that the screws have a resulting throughput capacity of up to 20% of the capacity of the threads of the screws in the inlet and outlet section, the latter being connected to the threads of the mixing section by transfer elements that mutually engage one another to strip plastic material therefrom and from the walls of the bores in the housing.

In the screw kneader of the invention, a broad distribution of fillers and liquid additives can be provided in the polymer melt free of residues. This is of particular importance in the production of composites, i.e. in the case of filling and reinforcing polymers of the most varied type in the fused state. However, maximum requirements have been established for the blending of polymers with a homogeneous distribution of substances in the polymer matrix. It is essential to the invention that in the entire mixing section a variable distribution of the additives in the polymer matrix is achieved because a large number of flow distribution processes occur over a defined segment with a small input of energy. The length of the mixing section can be easily determined empirically by knowing the crude polymer to be processed and its filling behavior as well as the filling and additive materials to be intermixed with the polymer.

Unlike conventional conveyance defined predominantly by the melt pressure in the mixing section, because the openings in the threads in the mixing section produce a reduced conveyance throughput, a rotational flow extending into the inlet and outlet sections is developed, whereby not only is the mixing intensified but an additional mixing effect is achieved in the inlet and outlet sections.

In accordance with the invention, the threads of the mixing section define gaps between adjacent threads which intercommunicate via said openings in the threads of said mixing section.

According to a preferred embodiment, the pitch of the threads of the mixing section is between 0.2 and 0.3 times the outside diameter of the mixing section. This has the effect of providing optimal flow distribution characteristics especially when the number of openings formed in the threads of the mixing section are 12 to 16 in number for each thread turn and the width of the teeth remaining between adjacent openings is at least 1 mm.

A uniform mixing and flow of the plastic material is obtained in the mixing section when the openings in the threads of the mixing section are inclined, relative to the axis of rotation of the screw, at an angle of between 43° and 62° as measured between the axes of the openings and a transverse plane perpendicular to the axis of rotation of the screw.

In order to promote the intensity of the mixing in the mixing section, there is provided according to a further embodiment, an inclination of at least some of said openings in the threads of the mixing section in a direction opposite the direction of the other openings.

The transfer elements are formed with spaced helical threads disposed between the threads of the mixing section and the threads of the inlet and outlet sections to provide effective material transfer between these sections while avoiding rheological dead zones and maintaining a self-cleaning effect without any special introduction of shearing energy.

An especially smooth transfer of the plastic material is obtained when the threads of the transfer element are connected to 2 or 3 helical turns of the threads of the inlet and outlet sections and to one turn of the threads of the mixing section.

DETAILED DESCRIPTION OF PREFERRED EMBODIMENT

Figure 1:
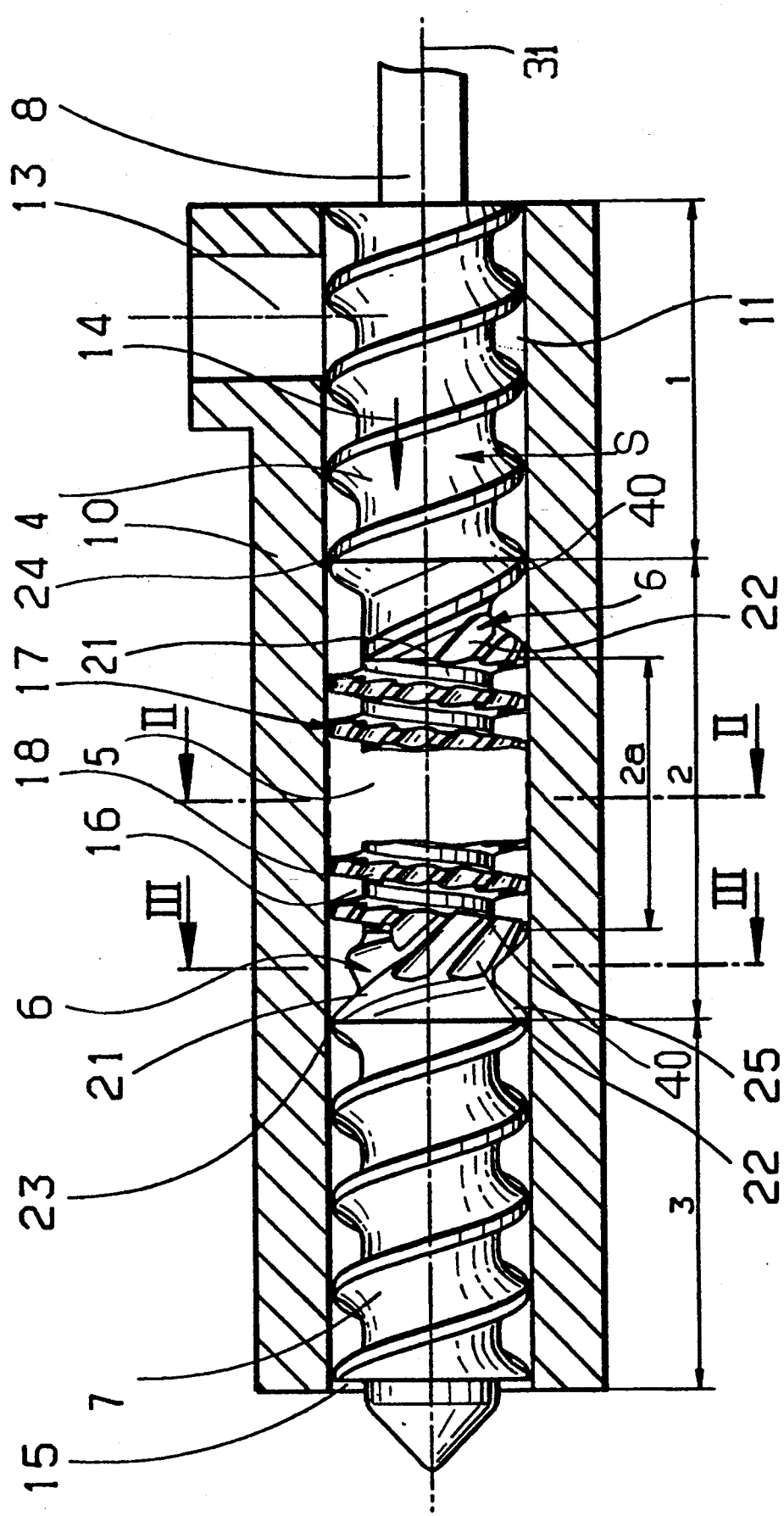
FIG. 1 is a longitudinal sectional view of a screw kneader according to the invention.
Figure 2:
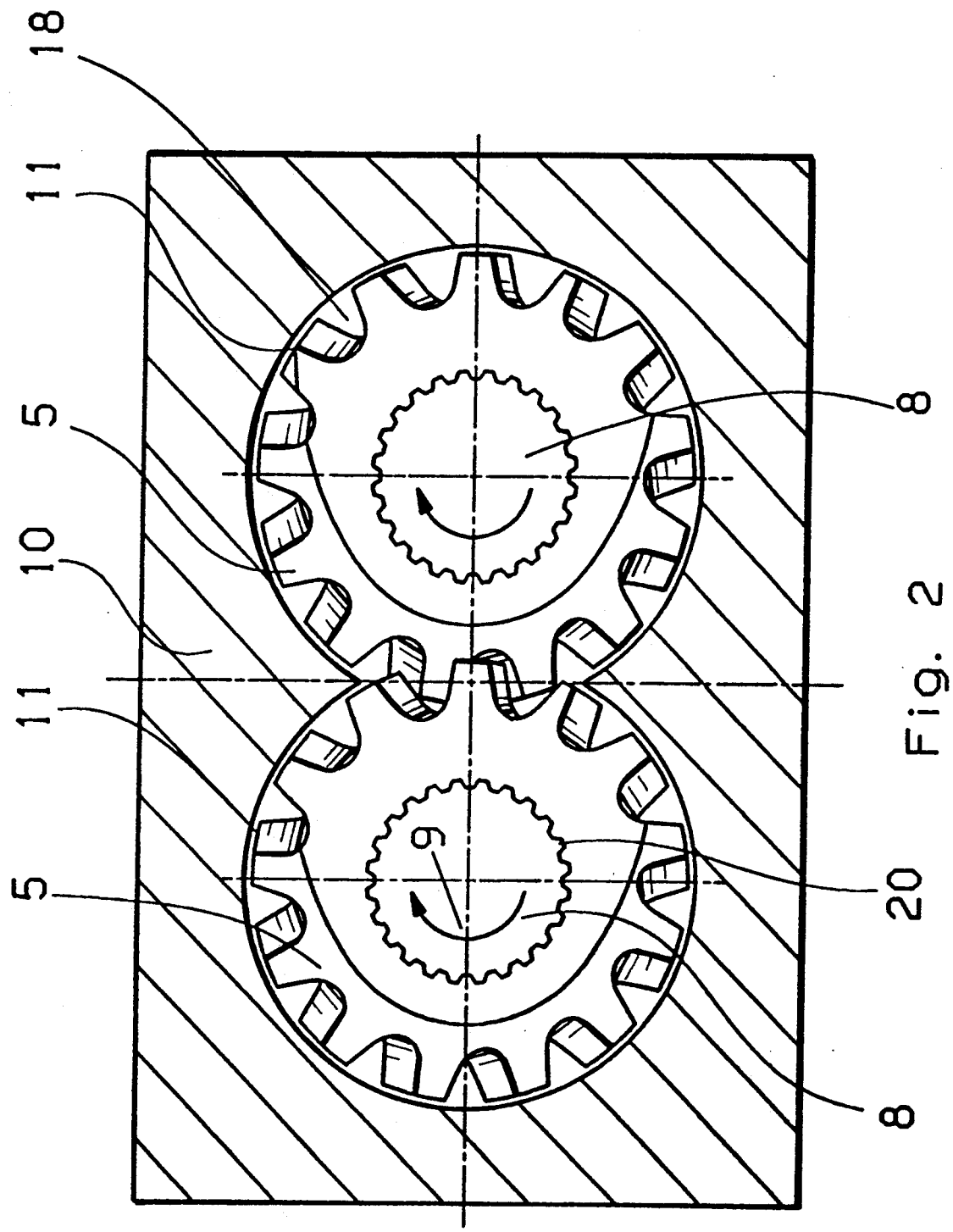
FIG. 2 is a sectional view taken along line II—II in FIG. 1.
Figure 3:
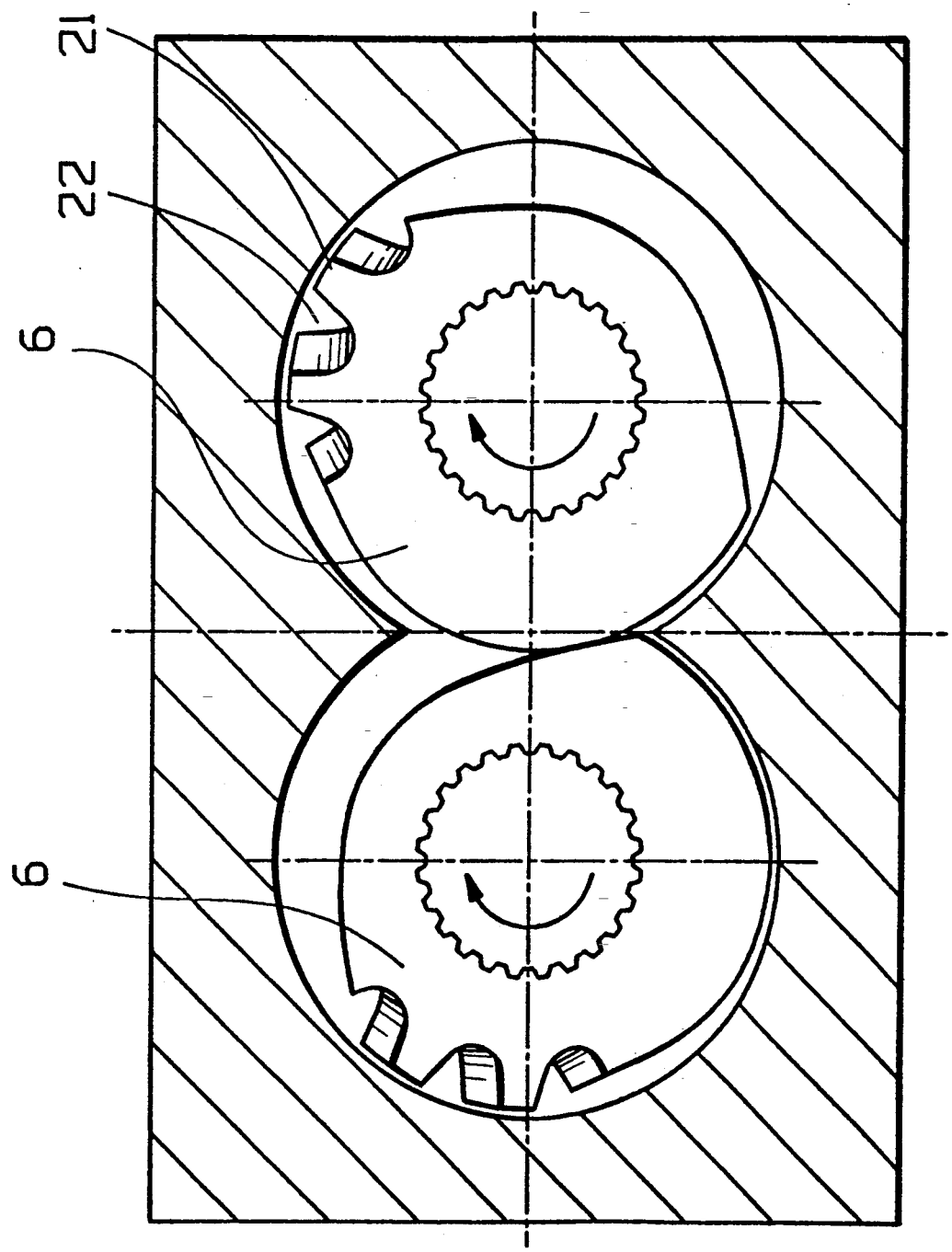
FIG. 3 is a sectional view taken along line III—III in FIG. 2.

FIGS. 1-3 show a screw kneader according to the invention for conveying and mixing plastic melt, optionally with the addition of additives to the melt. The screw kneader has three successive sections through which the plastic melt is conveyed constituted by an inlet section 1, a mixing section 2 and an outlet section 3. The screw kneader has a housing 10 formed with two parallel bores 11, which as best seen in FIGS. 2 and 3, overlap one another; in each bore 11 there is coaxially and rotatably mounted a longitudinal screw S.

In the inlet section 1, the screws S have portions 4 with threads of a hand (right hand in FIG. 1) for conveying plastic melt in the direction of the arrow 14 when the screw elements are rotated clockwise as shown by the arrows 9 in FIG. 2. The threads of screw portions 4 of the two screws S intermesh to strip plastic material from the threads, as the screws rotate, while also stripping plastic material from the walls of the bores 11. In the mixing section 2, the screws S include portions 5 which effect mixing in a zone 2a, and transfer portions 6 respectively connecting the portions 5 to the outlet section 3 and the inlet section 1. Instead of a uniform arrangement of the threads in the portions 5 they can be modified to achieve different effects as will be explained later. In the outlet section 3, the screws S have portions 7 with threads arranged in similar manner to those of the threads in inlet section 1 for conveying the plastic material through the outlet section 3 to a discharge outlet 15 at the ends of the bores 11.

The screws S are provided with grooved, axial bores in which splines 20 of drive shafts 8 are engaged to provide rotational drive of the screws S by the drive shafts 8. In this way, the screws S can be comprised of separate segments forming the sections 1, 2, and 3. Additionally, in section 2 the transfer portions 6 can be separate from the mixing portions 5 and the latter can be formed of a number of segments each with one thread turn.

The housing 10 is provided with an inlet opening 13 for supply to screws S of plastic melt or polymer along with various additives for stabilizing, filling, reinforcing and blending of various plastics. Other inlet openings (not shown) can be provided for addition of separate additives, downstream of inlet 13 within the inlet zone 1. The finished, mixed, plastic product is discharged at outlet 15.

The screw portions 4 and 7 of inlet and outlet sections 1 and 3, respectively, serve for the advance of the mixed material whereas screw portions 5 perform intermixing and blending of the fillers or liquid additives in the polymer matrix. For this purpose, screw portions 5 are configured in a special way. As shown in FIG. 1, the screw portions 5 have threads 17 inclined in opposite direction to the threads in sections 1 and 3 (to the left in FIG. 1) thereby acting to convey the mixed material in the direction of arrow 30 (FIG. 4) opposite the conveying direction (arrow 14). The threads of section 5 can be spirally wound as a left hand thread or they can be formed as separate, inclined annular segments The pitch of the threads 17 of screw portions 5 is between 0.2 and 0.35 of the outer diameter of threads 17. The threads 17 are provided with a number of slots or openings 18 all around the periphery thereof for allowing a portion of the plastic melt to travel in the direction of advance 14. Preferably, the amount of plastic melt advanced through openings 18 is 10% of the amount of plastic melt conveyed by the threaded portions 4 and 7 in the inlet and outlet sections 1 and 3, respectively, depending on the number and arrangement of openings 18. The magnitude of conveyed plastic material in mixing section 2 can reach 20% as a maximum, with a corresponding effect on the degree of homogenization of the mixed material. The openings 18 have an approximately V-shaped cross section and the openings are spaced along the periphery of the threads 17 of the screw portions 5 to provide communication between adjacent gaps 16. The openings 18 extend in the threads 17 along axes 19 (see FIG. 4) which are inclined at an angle $\Psi$ of 43°-62° relative to a transverse plane perpendicular to axis 31 of the screw S. A combined pressure-drag flow is thereby produced in mixing zone 2a. A particularly intensive distributive mixing of the components of the mixed material with a small input of energy is produced, including the multiple flow distribution obtained in the openings 18 in threads 17. A cleaning or stripping of the walls of the bores 11 of housing 10 is also produced in zone 2a whereby so-called dead zones with residual deposits of mixed material are avoided. In order to achieve this effect sufficiently, screw portions 5 are combined with the transfer elements 6 which strip themselves and the bores 11 in a self-cleaning manner. For this purpose, the transfer elements 6, as shown in the drawings are respectively formed with helical threads 21 extending from one end of the respective transfer element partly along its length and around a part of the periphery of the transfer element. At the ends facing the mixing portions 5, the threads 21 form a tooth-like arrangement 25 in correspondence with the threads 17 of mixing portions 5 so that the spaces 22 between the threads 21 of transfer section 6 are aligned with the spaces 19 in mixing section 5 to permit material flow therebetween. The threads 21 extend away from the toothlike arrangement 25 and merge into threads which extend to the opposite ends of the transfer elements and join with the threads 23 and 24 respectively of outlet and inlet sections 3 and 1. Preferably, two or three turns of threads 40 are formed on transfer section 6. By this arrangement, a direct connection is formed between the threads 17 of mixing portions 5 and threads 23 and 24 of portions 7 and 4 for flow of the plastic melt therebetween. Also for this purpose, as shown particularly in FIG. 3 in combination with FIG. 1, the openings 18 in threads 17 are placed into communication with spaces 22 between threads 21 of transfer elements 6 so that a free material flow is effected. Overall, an outstanding distribution of the mixing components in the mixed material is produced in combination with the self-cleaning effect of these elements without formation of disturbing deposits in bores 11 or on the screw portions and the transfer portions.

Figure 4:
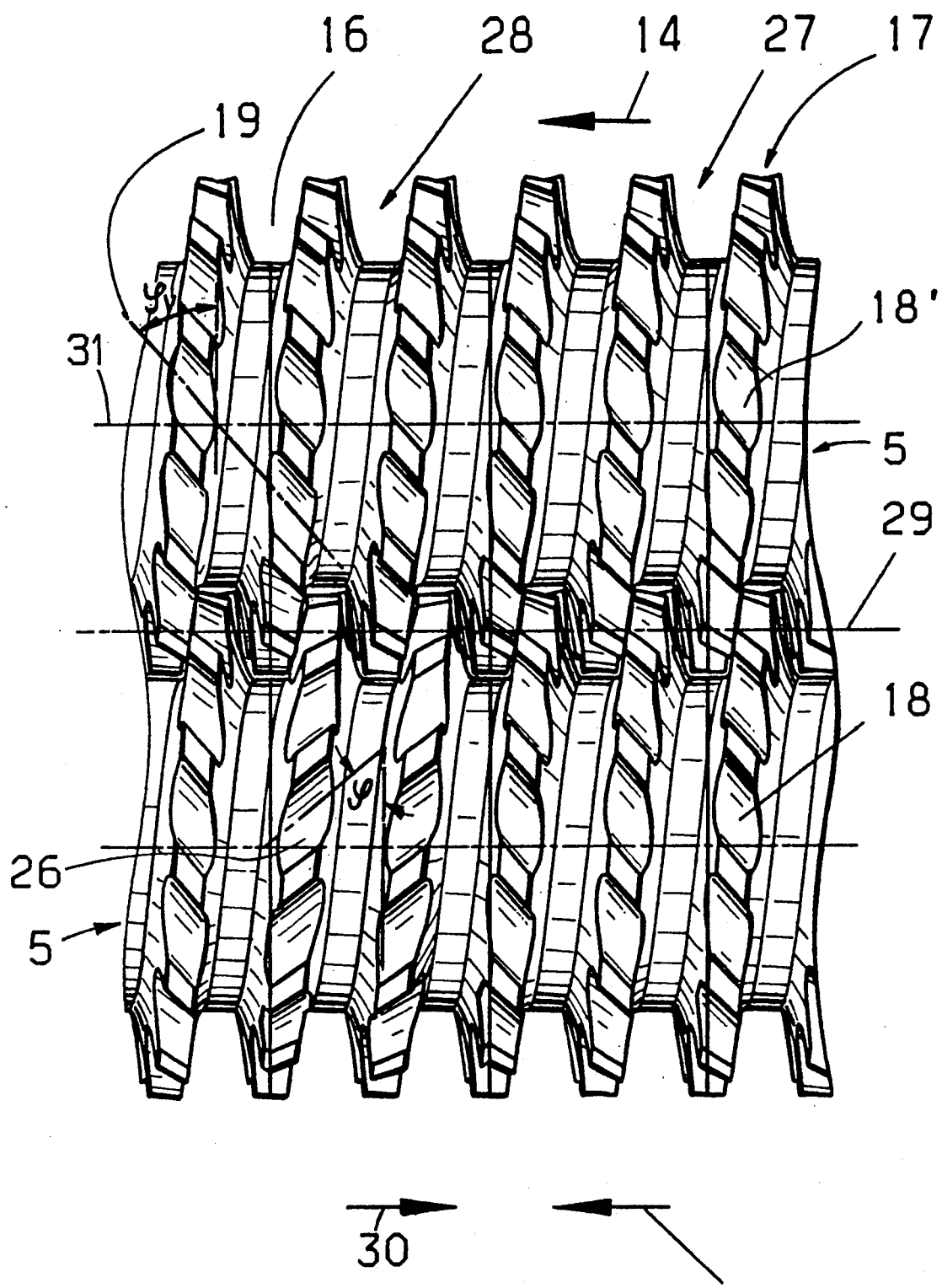
FIG. 4 is an elevational view, on a larger scale, of threaded elements in a mixing section in a modification of the screw kneader of FIG. 1.

In addition, a special mixing effect is produced by the embodiment shown in FIG. 4 where several screw portions 5, 5' are arranged in pairs one above the other. The screw portion 5 of one pair (the lower pair in FIG. 4) has selected openings 26, which are inclined in a direction opposite the openings 18 for conveying the material in the opposite direction. Thus, each pair of screw portions is formed with one group of threads 27 having openings 18, 18' which transport material in the general direction of arrow 14 and a second group 28 of which screw portion 5 has openings 26 inclined in the opposite direction for transport of material in the general direction of arrow 30 opposite the direction of arrow 14. The angle $\Psi$ of the openings 26, corresponding to the transport direction 30, relative to a plane perpendicular to the axis 31 is between 43° and 62°. In this way, a reversal of transport direction is produced within the threads of group 28 thus producing an approximately circular motion of the mixed material in this region outwards of central axis 29 of the kneader. A greater degree of homogenization is produced in the product due to the additional mixing effect produced thereby.

In the embodiment of the screw portions 5 in mixing section 2 illustrated in FIGS. 1 and 2, the flanks of the threads 17 are shown as square; however, the flanks can be of V-shape when less intense backflow is desired. The openings 18 are provided at the periphery of the threads 17 and the openings have a generally V-shaped cross section. The openings 18 are circumferentially spaced equally around the threads and between twelve and sixteen openings 18 are provided in each turn. The threads have a tooth width between adjacent openings 18 which is at least 1 mm. The portion 5 has an outer diameter which is between 2.5 and 6 times the spacing between adjacent openings 18. The threads of portion 5 have a pitch of between 0.2 and 0.3 times the outside diameter of portion 5.

Although the invention has been described in relation to specific embodiments thereof, it will become apparent to those skilled in the art that numerous modifications and variations can be made within the scope and spirit of the invention as defined in the attached claims.

What is claimed is:

1. A screw kneader for a plastic material comprising a housing having parallel bores overlapping one another, a pair of longitudinal screws each rotatably mounted coaxially in a respective one of said bores, said screws including respective, successive, first, second and third sections, each of said first, second and third sections being respectively formed with threads, the threads of the first, second and third sections of the pair of screws respectively interengaging one another for stripping plastic material from the screws and from walls of the bores, the threads of said first and third sections having a thread direction to form conveyor sections for advancing the plastic material from an inlet region of the housing at said first section to an outlet region of the housing at said third section, whereat the plastic material can be discharged at an outlet of the housing, the threads of said second section of the screws having a thread direction opposite the thread direction of the threads in said first and third sections to form a mixing section in which the advance of said plastic material is opposed and mixing of said plastic material is produced in said second section, said threads of said second section being provided with openings to permit passage of up to 20% of said plastic material in a direction of advance, and transfer elements connecting opposite ends of the second section of said screws respectively with said first and third sections of said screws, said transfer elements of the pair of screws mutually engaging one another to strip plastic material therefrom and from the walls of said bores, each said transfer element having one end adjacent to the threads of a respective end of said mixing section and a second end adjacent to the threads of a respective conveyor section, said transfer element including first spaced helical threads extending from said one end partly along the length of said transfer element, said first spaced helical threads being abutted against and being aligned with the threads of said mixing section and having spaces therebetween communicating with said openings in the threads in said mixing section, said transfer element further including a second helical thread extending from said second end of the transfer element and merging with said first helical threads of said transfer element, said second helical thread confronting and merging with the thread of said respective conveyor section.

2. A screw kneader as claimed in claim 1, wherein the threads of said second section define gaps between adjacent threads which gaps intercommunicate via said openings in the threads of said second section.

3. A screw kneader as claimed in claim 2, wherein said threads of said second section have a pitch of between 0.2 and 0.3 times the outside diameter of said threads in said second section.

4. A screw kneader as claimed in claim 3, wherein said openings have a V-shaped cross section.

5. A screw kneader as claimed in claim 2, wherein said openings are provided at the periphery of the threads in said second section.

6. A screw kneader as claimed in claim 5, wherein said openings are circumferentially spaced around said threads.

7. A screw kneader as claimed in claim 6, wherein 12 to 16 of said openings are provided in said threads around the periphery thereof for each turn of said threads, said threads having a tooth width between adjacent openings of at least 1 mm.

8. A screw kneader as claimed in claim 6, wherein the threads of the second section have an outer diameter which is between 2.5 and 6 times the spacing between adjacent openings.

9. A screw kneader as claimed in claim 5, wherein said openings are inclined relative to an axis of rotation of said screw.

10. A screw kneader as claimed in claim 9, wherein the angle between each of the openings and the axis of rotation of the screw is between 43° and 62° as measured between each said opening and a transverse plane perpendicular to said axis of rotation.

11. A screw kneader as claimed in claim 1, wherein the second helical thread of each of said transfer elements includes at least two turns.

12. A screw kneader as claimed in claim 1, wherein said first, second, and third sections of said screws and said transfer elements respectively comprise individual segments in axial abutment with one another.

* * * * *